No. 887,900. PATENTED MAY 19, 1908.
L. F. ADT.
MOUNTING FOR EYEGLASSES.
APPLICATION FILED APR. 30, 1906.
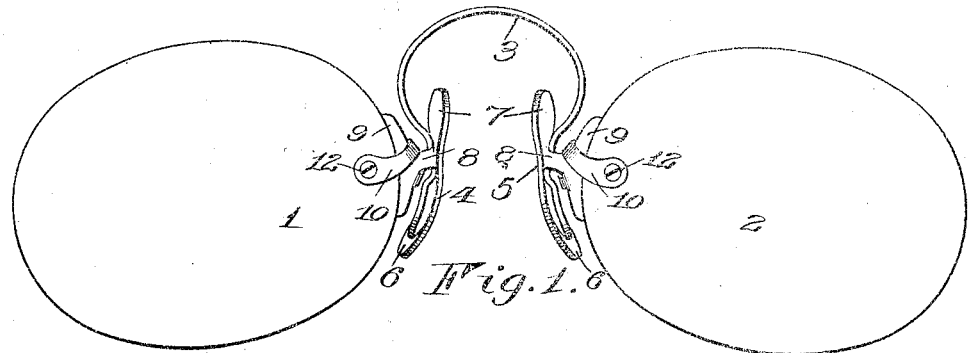
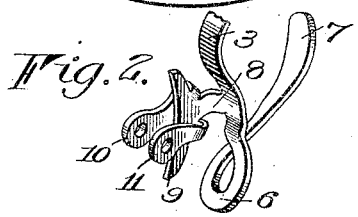
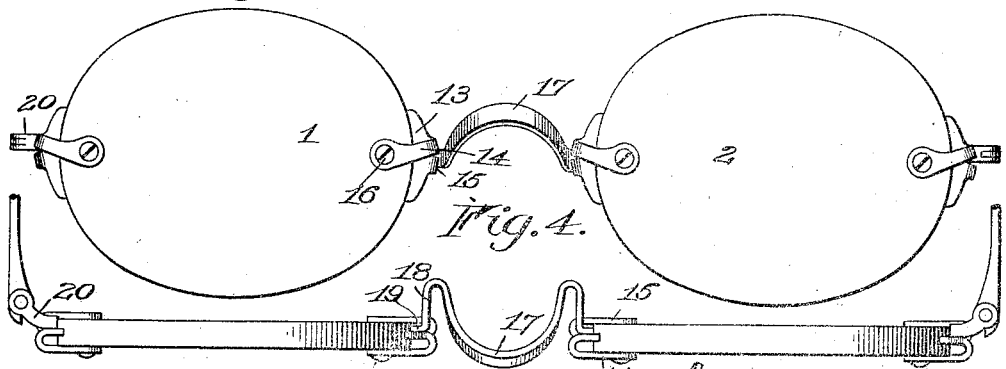
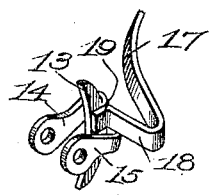
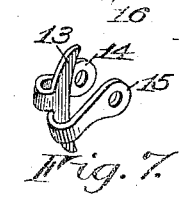
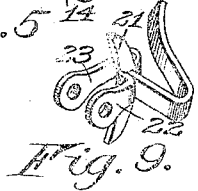
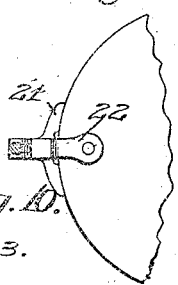
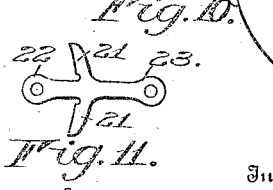
Witnesses
Walter B. Payne
Clarence A. Bateman.
Inventor
Leo F. Adt
By Frederick F. Church
his Attorney

UNITED STATES PATENT OFFICE.

LEO F. ADT, OF ALBANY, NEW YORK.

MOUNTING FOR EYEGLASSES.

No. 887,900.

Specification of Letters Patent.

Patented May 19, 1908.

Application filed April 30, 1906. Serial No. 314,330.

*To all whom it may concern:*

Be it known that I, LEO F. ADT, of Albany, in the county of Albany and State of New York, have invented certain new and useful Improvements in Mountings for Eyeglasses; and I do hereby declare the following to be a full, clear, and exact description of the same, reference being had to the accompanying drawings, forming a part of this specification, and to the reference-numerals marked thereon.

My present invention relates to improvements in mountings for eyeglasses and spectacles, and particularly to those of the rimless type, and it has for its object to provide improved means for attaching the lenses to the mounting whereby sufficient rigidity and security is afforded to prevent relative movement between the mounting and the lenses, especially in the plane of the lenses, and this is accomplished with a minimum amount of material, and in such a way as to materially simplify and cheapen the manufacture of the lens-attaching devices.

To these and other ends the invention consists in certain improvements and combinations of parts, all as will be hereinafter more fully explained, the novel features being pointed out in the claims at the end of the specification.

In the drawings: Figure 1 represents a front elevation of a pair of eyeglasses embodying lens-attaching devices, constructed in accordance with my invention, the lens-attaching devices in this form being made integrally with the mounting. Fig. 2 is a perspective view of a portion of the mounting showing one of the lens-attaching devices with the lens detached, and Fig. 3 represents a blank from which a mounting such as that shown in Figs. 1 and 2 may be formed. Figs. 4 and 5 represent a front elevation and a plan view, respectively, of a pair of spectacles having lens-attaching devices embodying my invention applied to the bridge and the temples thereof. Fig. 6 is a perspective view of a portion of the mounting shown in Figs. 4 and 5 showing one of the lens-attaching devices connected to the bridge. Fig. 7 is a perspective view of one of the lens-attaching devices disconnected from its corresponding portion of the mounting, and Fig. 8 shows a blank from which the attaching devices shown in Figs. 4 to 7 inclusive, are formed. Fig. 9 is a view similar to Fig. 6 showing my invention embodied in a different form of attaching device. Fig. 10 is a rear view of a portion of one of the lenses showing an attaching device similar to that shown in Fig. 9 applied to the temples thereof. Fig. 11 shows a blank from which the attaching devices shown in Figs. 9 and 10 may be formed.

Similar reference numerals in the several figures indicate similar parts.

The purpose of the present invention is to obviate the weakness of the connection between the mountings and the lenses, particularly of the well known rimless variety, that enables the lenses to work loose around the fastening screws by reason of the insecure means afforded by the ordinary lens-edge bearing portions to prevent relative movement of the parts in the plane of the lenses, and this defect is remedied according to my present invention without unduly enlarging the parts, by presenting substantially flat lens-edge bearing portions edgewise to the lens edge, so that forces tending to turn the lenses about their securing screws will be resisted by the material in the direction of its greatest resisting powers, so that the greatest strength is secured with a minimum weight of material. The attaching lugs which are preferably formed integrally with the lens-edge-bearing portion operate to hold the latter centered, and are so arranged as to accommodate lenses of different thicknesses as well as those having the screw aperture at different distances from the edge.

In Figs. 1 to 3 inclusive the invention is shown in connection with a pair of rimless eyeglasses, embodying generally the lenses 1 and 2, connected by the bridge 3 and having the nose guards 4 and 5, which are permitted to operate by the resiliency of the bridge and are arranged to engage the wearer's nose to support the lenses in position. The guards shown are generally preferred, forming continuations of the ends of the bridge and extending downwardly and doubled upwardly to form a resilient loop 6, the free end of the loop being extended upwardly beyond the point of attachment of the guard and formed with an upper nose-bearing surface 7. The lens-attaching devices in this form of the invention are preferably formed integrally with the spring and guards, and are each attached thereto by an arm 8 extending edgewise from the forward edge of the material, and turned outwardly where it is provided with a flat segmental-shaped bearing portion 9, the farther edge of which is shaped to conform with, and engage an edge of the lens. From the edge of the bearing portion 9 opposite to the lens-engaging edge extend a pair of lugs 10 and 11, preferably arranged at either side of the attaching arm 8 and are doubled at either side of the bearing member and extended so as to overlap the front and rear surfaces of the lens, these lugs being conveniently provided with apertures to receive the usual fastening screw 12 which passes through the lens and clamps the attaching lugs against the opposite surfaces thereof.

A mounting of the kind above described may be conveniently formed from a blank of flat material such as is shown in Fig. 3, the guards 4 and 5 forming substantial continuations of the bridge 3, and the arm 8 extending laterally at the sides where the guards unite with the ends of the bridge, the lens-edge bearing portions 9 extending transversely from opposite edges of the arm 8 and having the lugs 10 and 11 extending therefrom arranged at either side of the arm 8.

In Figs. 4 to 8 inclusive, lens-attaching devices similar to those shown in Figs. 1 to 3 are applied to the well known form of spectacles, the lens-edge bearing portion 13 of each attaching device having the attaching lugs 14 and 15 extending from the edge thereof opposite to the lens-engaging edge and doubled back at either side of the bearing portion, and lapped on the opposite lens surfaces where they are secured by the fastening screw 16, the bridge 17 being in this instance formed separately and provided with an arm 18 having a lug 19 thereon soldered or otherwise secured, preferably to the side of the lens-edge bearing portion 13 opposite to the attaching lug 14. The temple pieces in this form of the invention are provided with attaching devices formed substantially the same as those for the bridge, the hinge piece 20 being soldered to the side of the corresponding lens-edge bearing portion. Fig. 8 shows a blank of flat material from which the attaching devices shown in this form of the invention may be constructed, the attaching lugs 14 and 15 both extending from that edge of the bearing portion 13 opposite to the lens-engaging edge.

In Figs. 9, 10 and 11 the lens-edge bearing portion 21 is provided with attaching lugs 22 and 23 extending from opposite edges thereof, the arm 22 extending from the edge thereof which is adapted to fit the lens edge, extending first laterally of the bearing portion and thence outwardly in a direction substantially parallel to the surface of the edge-bearing portion to overlap the lens surface, while the lug 23 extending from the further edge of the bearing portion is doubled to form a loop, and thence extended sufficiently far to overlap the opposite lens surface, the attaching devices being secured to the bridge and temple pieces in a manner similar to that described in connection with the forms shown in Figs. 4 to 7 inclusive.

By constructing the lens-attaching devices in accordance with my invention, the lens-edge bearing portion presents the material edgewise to the edge of the lens so that the greatest resisting power of the material is utilized to prevent turning movement of the lenses about their fastening screws, and by extending either one or both of the attaching lugs from that edge of the edge-bearing portion farthest removed from the lens-edge, a loop is formed affording ample adjustment to accommodate lenses of different thicknesses, as well as to receive lenses in which the screw aperture is at different distances from the lens-edge. The simple construction of the lens-attaching devices enables them to be punched and formed entirely from sheet material, reducing the amount of material required and thereby cheapening their cost, and in use they are not conspicuous when applied to the lenses of eyeglasses or spectacles.

I claim as my invention:

1. The combination with a mounting, and the lenses therefor, of attaching devices for connecting the mounting and lenses each embodying a bearing portion of flat material presented edgewise to the lens-edge, and having an attaching lug extending from the farther edge of the bearing portion and secured to the lens.

2. In eyeglasses and spectacles, the combination with the mounting, and the lenses, of attaching devices for connecting the lenses to the mounting each embodying a bearing portion having an edge adapted to engage the lens-edge, and an adjustable attaching lug extending from the edge of the bearing portion opposite to the lens-engaging edge and secured to the lens.

3. In eyeglasses and spectacles, the combination with the mounting therefor, and the lenses, of attaching devices suitably connected to the mounting each embodying a bearing portion having an edge engaging the lens edge, and a looped attaching lug extending from an edge of said bearing opposite to the lens-engaging edge and secured to a surface of the lens.

4. In eyeglasses and spectacles, the combination with the mounting therefor, and the lenses, of attaching devices suitably connected to the mounting each embodying a bearing portion of flat material having an edge engaging the lens-edge, and a pair of attaching lugs extending from an edge of said bearing portion opposite to the lens-engaging edge, and secured at opposite sides of the lens.

5. In eyeglasses and spectacles, the combination with a mounting, and lenses therefor, of attaching devices suitably attached to appropriate parts of the mounting each embodying a bearing portion of flat material having an edge engaging the lens-edge, and attaching lugs having edgewise connections with an edge of the bearing portion opposite to the lens-engaging edge thereof and fastened to the lens.

6. In eyeglasses and spectacles, the combination with a mounting, and lenses therefor, of attaching devices suitably attached to the mounting each composed of a single piece of flat material embodying a bearing portion having an edge engaging a lens-edge, and attaching lugs forming continuations of an edge of the bearing portion opposite to the lens-engaging edge thereof, said lugs being doubled and overlapping the opposite lens surfaces.

7. In eyeglasses and spectacles, the combination with the mounting, and lenses therefor, of attaching devices suitably connected to the mounting each embodying a substantially flat bearing portion having an edge engaging a lens-edge, and attaching lugs having an edgewise connection with an edge of said bearing portion opposite to the lens-engaging edge thereof, said lugs being doubled to form loops having their ends overlapped and secured to the lens surfaces.

8. The combination with a mounting embodying a bridge and guards attached thereto, and lenses for the mounting, of lens attaching devices formed integrally with the bridge and guards each embodying a bearing portion connected at its inner edge to the mounting and engaging the lens-edge at its outer edge, and attaching lugs having an edgewise connection with the inner edge of said bearing and doubled on opposite sides of the bearing portion, and means for attaching said lugs to the lens.

9. In eyeglasses and spectacles, the combination with the mounting and lenses therefor, of lens-attaching devices suitably connected to the mounting each composed of a blank of sheet material having a bearing portion with an edge adapted to engage the lens-edge, and a pair of attaching lugs forming continuations of an edge of the bearing portion opposite to the lens-engaging edge and adapted to be fastened to the lens surfaces.

10. In eyeglasses and spectacles, the combination with the lenses, of a mounting composed of a blank of sheet material embodying a connecting bridge, guards connected to the bridge, connecting arms extending laterally of the bridge, lens-edge bearing portions extending transversely of said arms, and attaching lugs forming edgewise continuations of the bearing portions and arranged at the sides of said arms.

11. In eyeglasses and spectacles, the combination with a bridge and lens bearing portions formed of flat material and in a single piece, the lens bearing portions being presented edgewise to the lenses, of lens attaching lugs extending from the farther edges of the lens bearing portions.

12. In eyeglasses and spectacles, the combination with a nose guard and a lens bearing portion formed from flat stock and in a single piece, the lens bearing portion being presented edgewise to a lens, of a lens attaching lug extending from the farther edge of the lens bearing portion.

13. In eyeglasses and spectacles, the combination with a lens bearing portion, of adjustable lens attaching lugs extending from that edge of the lens bearing portion opposite the lens bearing edge.

14. In eyeglasses and spectacles, the combination with a lens bearing portion of looped lens attaching devices extending from that edge of the lens bearing portion opposite the lens bearing edge.

LEO F. ADT.

Witnesses:
EDWARD MURPHY, 2d,
MICHAEL F. O'CONNOR.